United States Patent [19]

Ishiguro et al.

[11] Patent Number: 4,507,691
[45] Date of Patent: Mar. 26, 1985

[54] EDITING CONTROL METHOD AND APPARATUS FOR VIDEO TAPE RECORDERS

[75] Inventors: Mamoru Ishiguro; Atsuo Matsuyama; Kazumasa Yamamura, all of Atsugi, Japan

[73] Assignee: Sony Corporation, Tokyo, Japan

[21] Appl. No.: 435,250

[22] Filed: Oct. 19, 1982

[30] Foreign Application Priority Data

Oct. 20, 1981 [JP] Japan .............................. 56-167670

[51] Int. Cl.³ ............................................. G11B 27/00
[52] U.S. Cl. .................................... 360/14.3; 360/74.4
[58] Field of Search ........................ 360/13, 14.1, 14.2, 360/14.3, 69, 73, 74.1, 74.4

[56] References Cited

U.S. PATENT DOCUMENTS 3,636,252  1/1972  Kowal ................................. 360/14.2
4,394,694  7/1983  Ninomiya et al. .................. 360/14.3

*Primary Examiner*—Robert L. Richardson
*Attorney, Agent, or Firm*—Lewis H. Eslinger; Alvin Sinderbrand

[57] ABSTRACT

An editing control apparatus for use with first and second video tape recording and/or reproducing apparatuses, each employing a video tape having time code signals and control signals recorded thereon and which is advanced at a predetermined forward speed for recording and reproducing a video signal thereon, comprises first and second time code readers for reading the time code signals on the video tapes, first and second control signal readers for reading the control signals on the video tapes, and a control unit for controlling the video tape recording and/or reproducing apparatuses in response to the time code signals and the control signals to position the video tapes at respective preroll points by rewinding each of the video tapes at a first speed substantially greater than the predetermined forward speed to first predetermined points, and thereafter rewinding the respective video tapes at a second speed substantially less than the forward speed to the respective preroll points.

34 Claims, 8 Drawing Figures

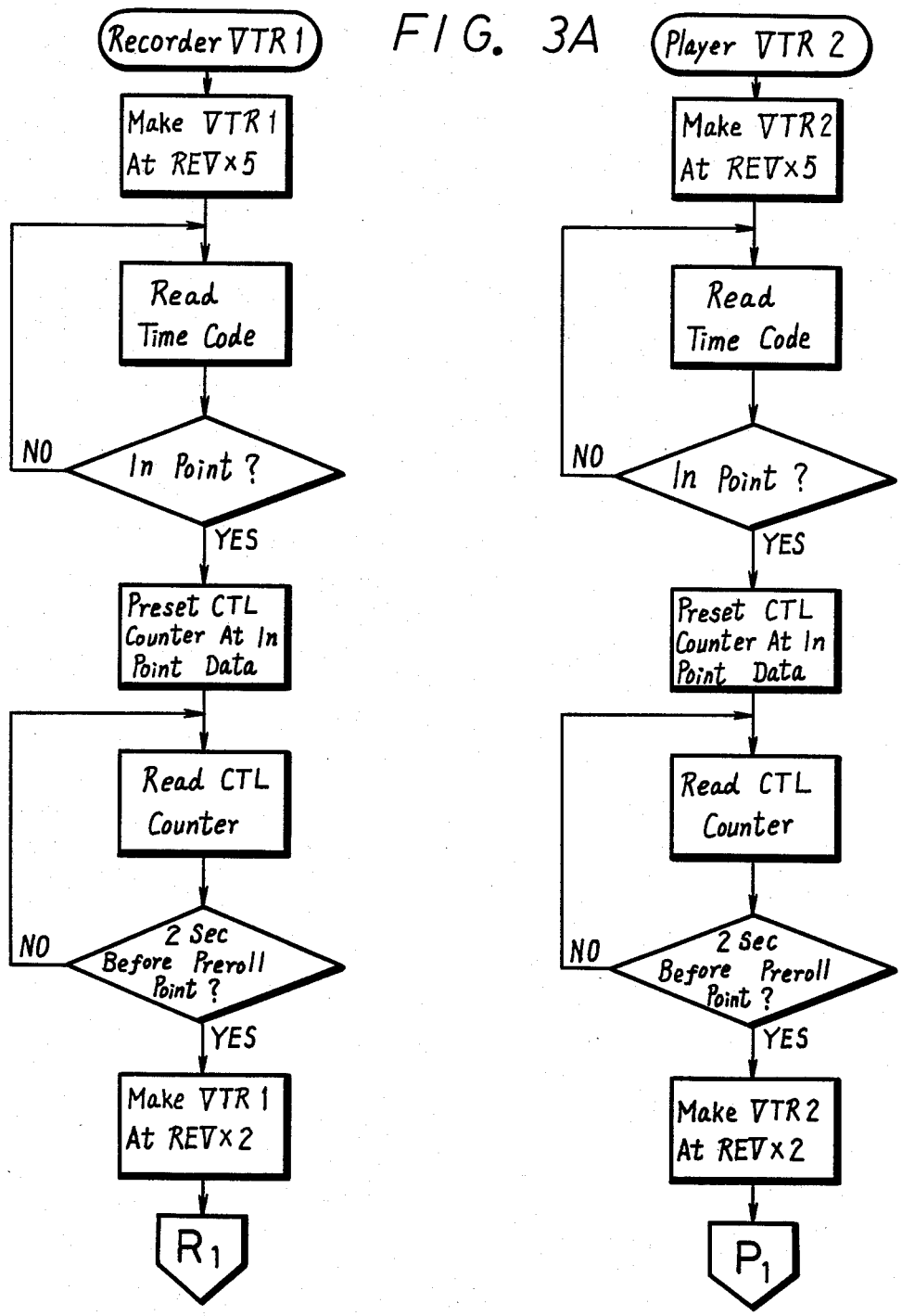

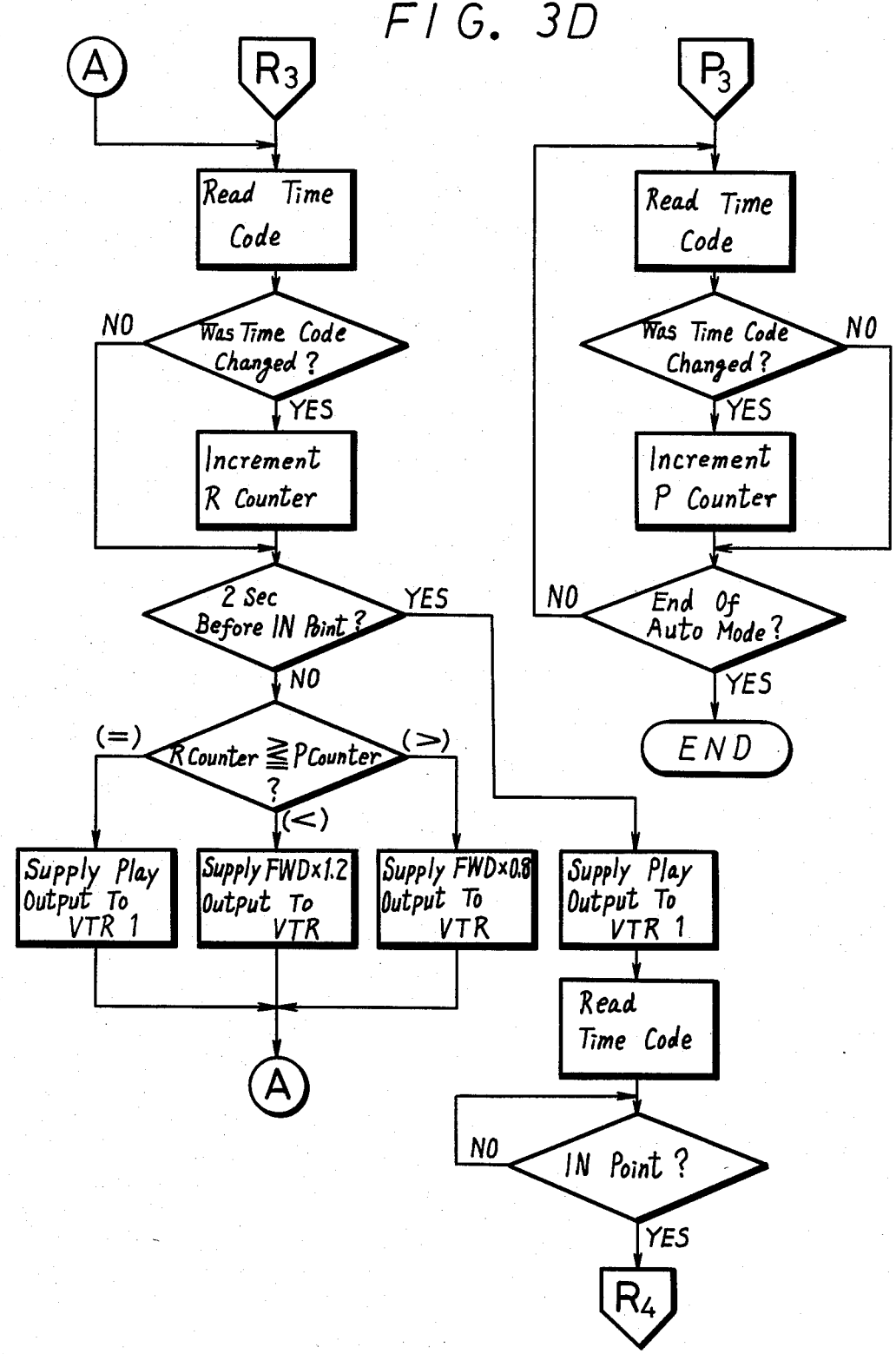

EDITING CONTROL METHOD AND APPARATUS FOR VIDEO TAPE RECORDERS

BACKGROUND OF THE INVENTION

1. Field of the Invention

This invention relates to editing control apparatuses, and more particularly, to an editing control method and apparatus for video tape recorders which permit accurate prerolling of the video tapes prior to editing.

2. Description of the Prior Art

In the editing of a video tape, a portion of the video tape to be edited has recorded thereon video information from another video source. The other video souce can be, for example, a video camera or a video signal recorded on another video tape. When the source of the video information is a video signal recorded on another video tape, one video tape recording and/or reproducing apparatus is required for each tape in order to produce an edited video tape.

When two video tapes are used in editing, they must be accurately positioned at respective preroll points, i.e., points on the video tapes located before the editing start points. After the video tapes are positioned at the respective preroll points, the video tapes are advanced in synchronism until the editing start points are reached and the actual editing operation begins.

In order to operate two video tape recording and/or reproducing apparatuses in synchronism, two types of signals recorded on the video tapes have been utilized. One type of signal is a time code signal such as the Society of Motion Picture and Television Engineers time code signal (SMPTE) or the like. Alternatively, control signals associated with the video tracks recorded on the video tapes have been used for synchronization.

The use of control signals to synchronize the video tapes has significant difficulties. While the tapes are moving, the synchronization of the video tapes can be detected quite accurately. However, when the direction of tape travel is changed, or pinch rollers used in driving the tape are intermittently engaged therewith so that the tape is not continuously advanced, the control signals can not be accurately detected, and, accordingly, it cannot be determined whether two tapes are operating in synchronism.

When time code signals are utilized to synchronize the editing of two video tapes, a unique address location on each tape can be detected even when the tape is at rest. However, time code signals are generally placed on the video tape during the recording process, and are consecutively numbered. If the tape is stopped, for example, during recording, the time code signals recorded on the tape are not consecutive. Thus, upon playback, precise time differences between the two tapes can not be detected accurately, making it difficult to synchronize the video tapes during editing.

OBJECTS AND SUMMARY OF THE INVENTION

Accordingly, it is an object of the present invention to provide an editing control method and apparatus for use with video tape recorders and/or reproducing apparatuses which can eliminate the aforesaid difficulties of the prior art devices.

It is another object of the present invention to provide an editing control method and apparatus for use with video tape recorders and/or reproducing apparatuses which can accurately position video tapes at their respective preroll points.

It is yet another object of the present invention to provide an editing control method and apparatus for use with video tape recording and/or reproducing apparatuses which can automatically perform a precise preroll of the video tape through the use of time code signals and control signals recorded thereon.

In accord with the present invention, an editing control apparatus for use with first and second video tape recording and/or reproducing apparatuses, each employing a video tape have time code signals and control signals recorded thereon and which is advanced at a predetermined forward speed for recording and reproducing the video signals thereon, comprises time code reading means for reading the time code signals on the video tapes, control signal reading means for reading the control signals on the video tapes, and controller means for controlling the video tape recording and/or reproducing apparatuses in response to the time code signals and the control signals to position the video tapes at respective preroll points by rewinding each of the video tapes at a first speed substantially greater than the predetermined forward speed to a first predetermined point, and thereafter further rewinding the respective video tapes at a second speed substantially less than the predetermined forward speed to the respective preroll points.

Further in accord with the present invention, a method of operating first and second video tape recording and/or reproducing apparatuses to edit video tapes employed therewith having time code signals and control signals recorded thereon, comprises the steps of rewinding the video tapes to respective first predetermined points at a first speed substantially greater than a predetermined forward speed used for recording and reproducing the video signals recorded thereon, reading the time code signals and the control signals on the video tapes, and further rewinding the video tapes at a second speed substantially less than the predetermined forward speed to respective preroll points in response to the time code signals and the control signals.

The above, and other objects, features and advantages of the invention will be apparent from the following detailed description of an illustrative embodiment which is to be read in connection with the accompanying drawings.

BRIEF DESCRIPTION OF THE DRAWINGS

FIGS. 3A to 3E are flow charts illustrating the operation of the editing control apparatus of FIG. 1.

DESCRIPTION OF THE PREFERRED EMBODIMENT

Figure 1:
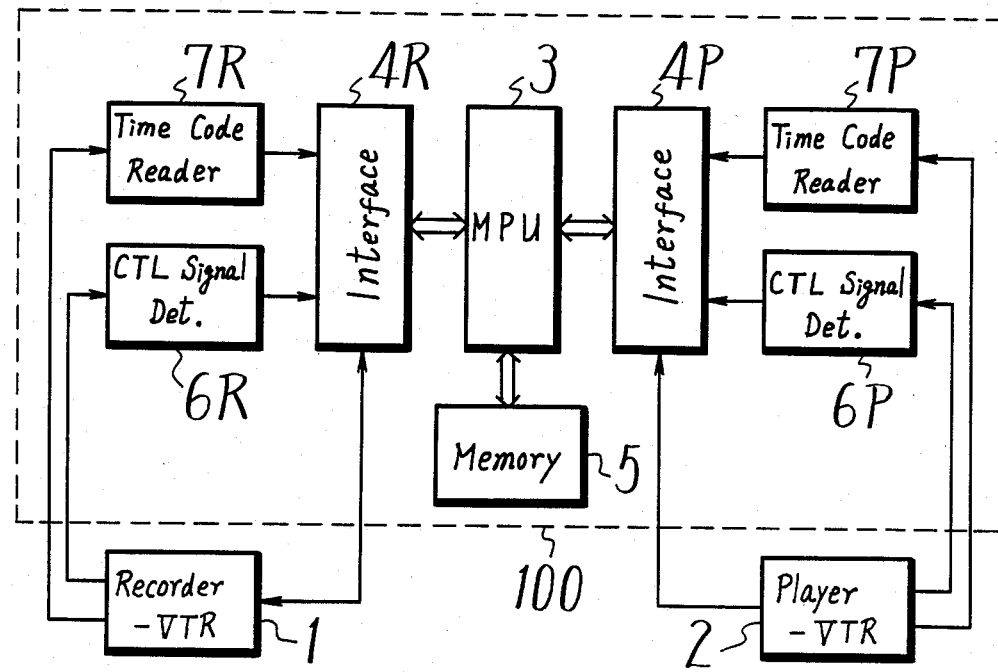
FIG. 1 is a block diagram of an embodiment of an editing control apparatus in accord with the present invention for use with video tape recording and/or reproducing apparatuses.

In FIG. 1, an editing control apparatus 100 according to an embodiment of this invention is shown connected to a first video tape recording and/or reproducing apparatus 1 (hereinafter referred to as a recorder-VTR)

for recording on a video tape and to a second video tape recording and/or reproducing apparatus 2 (hereinafter referred to as a player-VTR) for playing a video tape. In the illustrated embodiment, recorder-VTR 1 is used with a video tape to be edited, while player-VTR 2 is used with a video tape having a video signal which is to be added to the other video tape. Editing control apparatus 100 includes a microprocessor unit 3 (hereinafter referred to as an MPU) which is connected to recorder-VTR 1 and player-VTR 2 through interfaces 4R and 4P, respectively. A memory unit 5 is also connected to MPU 3 and includes a register, a counter, a read only memory (ROM) including a stored program for controlling the operation of editing control apparatus 100, and a random access memory (RAM) used for the execution of the program.

Control signal readers 6R and 6P detect control signals (sometimes referred to as "CTL signals") recorded on the video tapes employed with recorder-VTR 1 and player-VTR 2 and generate output signals in response thereto which are supplied to MPU 3 through interfaces 4R and 4P, respectively. MPU 3 supplies output signals in response thereto to memory 5 for counting, as will be explained more fully hereinbelow.

Time code readers 7R and 7P detect time code signals from recorder-VTR 1 and player-VTR 2 and supply output signals to MPU 3 through interfaces 4R and 4P. The time code signals from MPU 3 are also supplied to memory 5 for counting, as more fully described hereinbelow.

Figure 2:
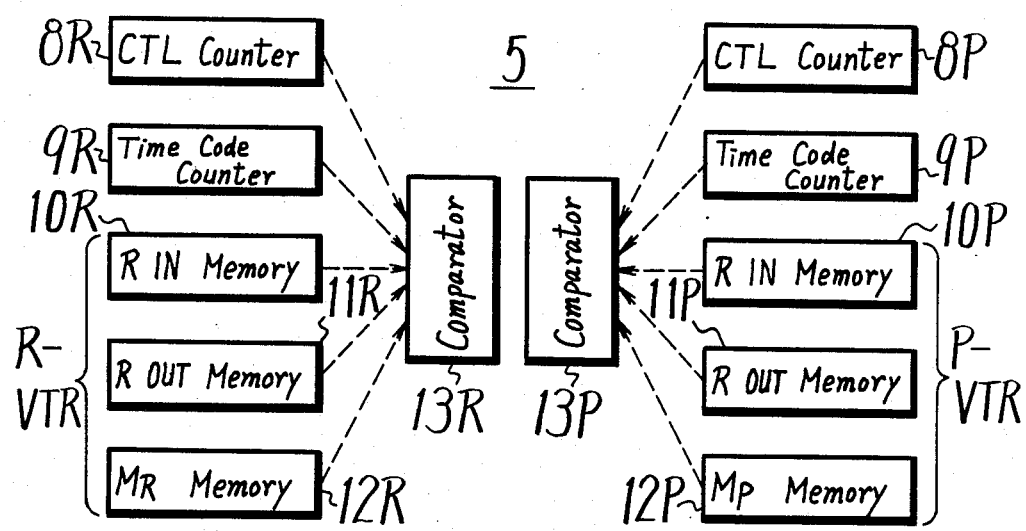
FIG. 2 is a block diagram of portions of a random access memory used in the embodiment of FIG. 1.

Editing control apparatus 100 performs an editing operation in response to time code signals and control signals under the control of a program stored in memory 5 and executed by MPU 3. FIG. 2 illustrates the allocation of memory space for the counters and memories in the RAM portion of memory 5. The RAM portion of memory 5 includes control signal counters 8R, 8P and time code counters 9R, 9P associated with recorder-VTR 1 and player-VTR 2, respectively. Control signal counter 8R counts the control signals read by control signal reader 6R, and control signal counter 8P counts the control signals read by control signal reader 6P. Time code signals from recorder-VTR 1 are read by time code reader 7R and supplied to time code counter 9R whereby changes in the time code signals are detected and counted. Time code signals from player-VTR 2 are read by time code reader 7P and supplied to time code counter 9P whereby changes in the time code signals are detected and counted.

Memory 5 includes portions for storing an editing start or "edit in" point and an editing end or "edit out" point for the video tapes. With reference to FIG. 2, the editing start point for recorder-VTR 1 is stored in R IN memory 10R, and the editing end point is stored in R OUT memory 11R. The editing start point for player-VTR 2 is stored in R IN memory 10P, and the editing end point is stored in R OUT memory 11P. An $M_R$ memory 12R is associated with recorder-VTR 1 and stores a time code signal derived therefrom under control of MPU 3. An $M_P$ memory 12P is associated with player-VTR 2 and stores a time code signal derived therefrom under control of MPU 3, as more fully explained hereinbelow.

Comparators 13R and 13P are associated with recorder-VTR 1 and player-VTR 2, respectively. Comparators 13R, 13P are used to identify points on the video tapes such as the editing points or preroll points in response to data stored in control signal counters 8R, 8P, time code counters 9R, 9P, R IN memories 10R, 10P, R OUT memories 11R, 11P, $M_R$ memory 12R, and $M_P$ memory 12P. Recorder-VTR 1 and player-VTR 2 are controlled in response to comparisons by comparators 13R, 13P.

The operation of the embodiment of FIG. 1 will next be described with reference to FIGS. 3A to 3E and the graph of FIG. 4, in which the flow charts represent the steps of an exemplary control program stored in memory 5.

As illustrated in FIG. 3A, MPU 3 actuates recorder-VTR 1 and player-VTR 2 to rewind the tapes employed therewith at a first predetermined speed "REV×5" which, in the preferred embodiment, is five times faster than the normal recording and playback speed. The time codes recorded on the video tapes are continuously read by time code readers 7R, 7P and tested against the time codes corresponding to respective predetermined editing start points, each referred to in FIG. 3A as the "in point". When the time codes read by time code readers 7R, 7P correspond to the editing start points, control counters 8R and 8P are preset with the editing start point data in response thereto. Control counters 8R and 8P are thereafter tested to identify the time points on the video tapes which are two seconds before the preroll points located on the video tapes. When time points $t_2$ (see FIG. 4) corresponding to two seconds before the preroll points are detected, the tapes on recorder-VTR 1 and player-VTR 2 are rewound at a second speed "REV×2", which, in the preferred embodiment, is twice the normal recording and playback speed.

Figure 3B:
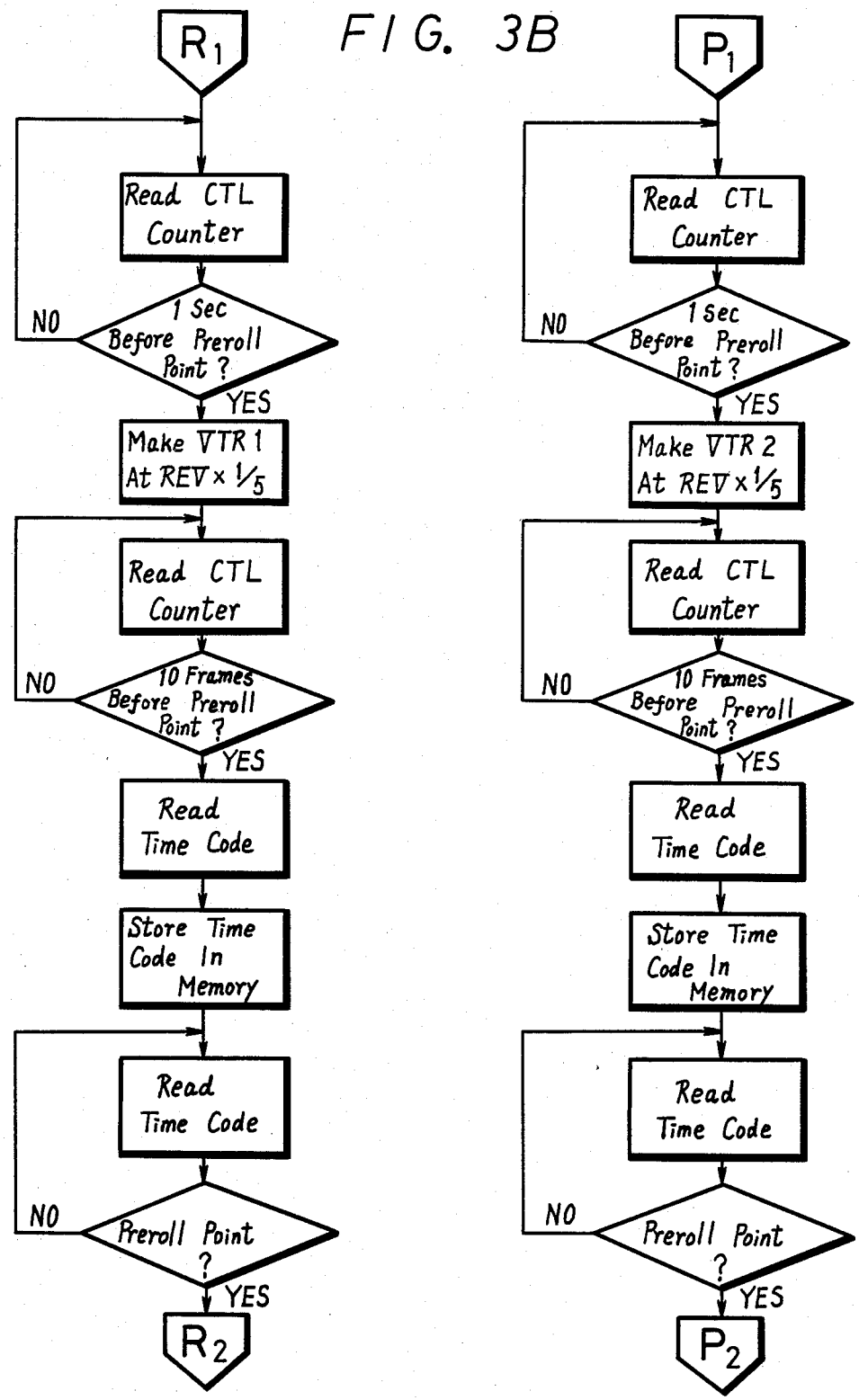
Figure 4:
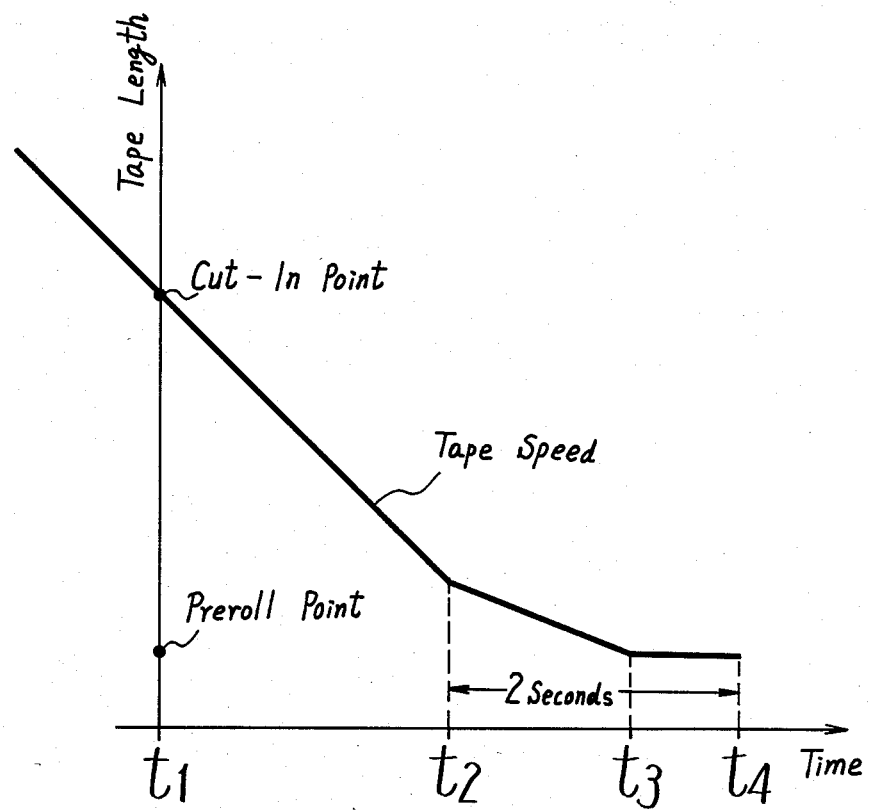
FIG. 4 is a graph illustrating the relationship between tape length and time when a video tape is rewound to a preroll point located on the video tape.

Referring to FIG. 3B, the control signals counted by control counters 8R, 8P are tested to identify the points on the video tapes which are one second before the preroll points, indicated as point $t_3$ in FIG. 4. When point $t_3$ is detected, the tapes on recorder-VTR 1 and player-VTR 2 are rewound at a third speed "REV×1/5", which, in the preferred embodiment, is one-fifth times as fast as the normal recording and playback speed. The control signals counted by control counters 8R, 8P continue to be tested to identify the points on the video tapes which are ten frames before the preroll points. When the points on the video tapes corresponding to ten frames before the preroll points are identified, time code signals $M_R$ and $M_P$ corresponding thereto are read and stored in $M_R$ memory 12R and $M_P$ memory 12P, respectively. The time code signals recorded on the video tapes are read by time code readers 7R, 7P to determine whether the points being read on the video tapes coincide with the preroll points.

Figure 3C:
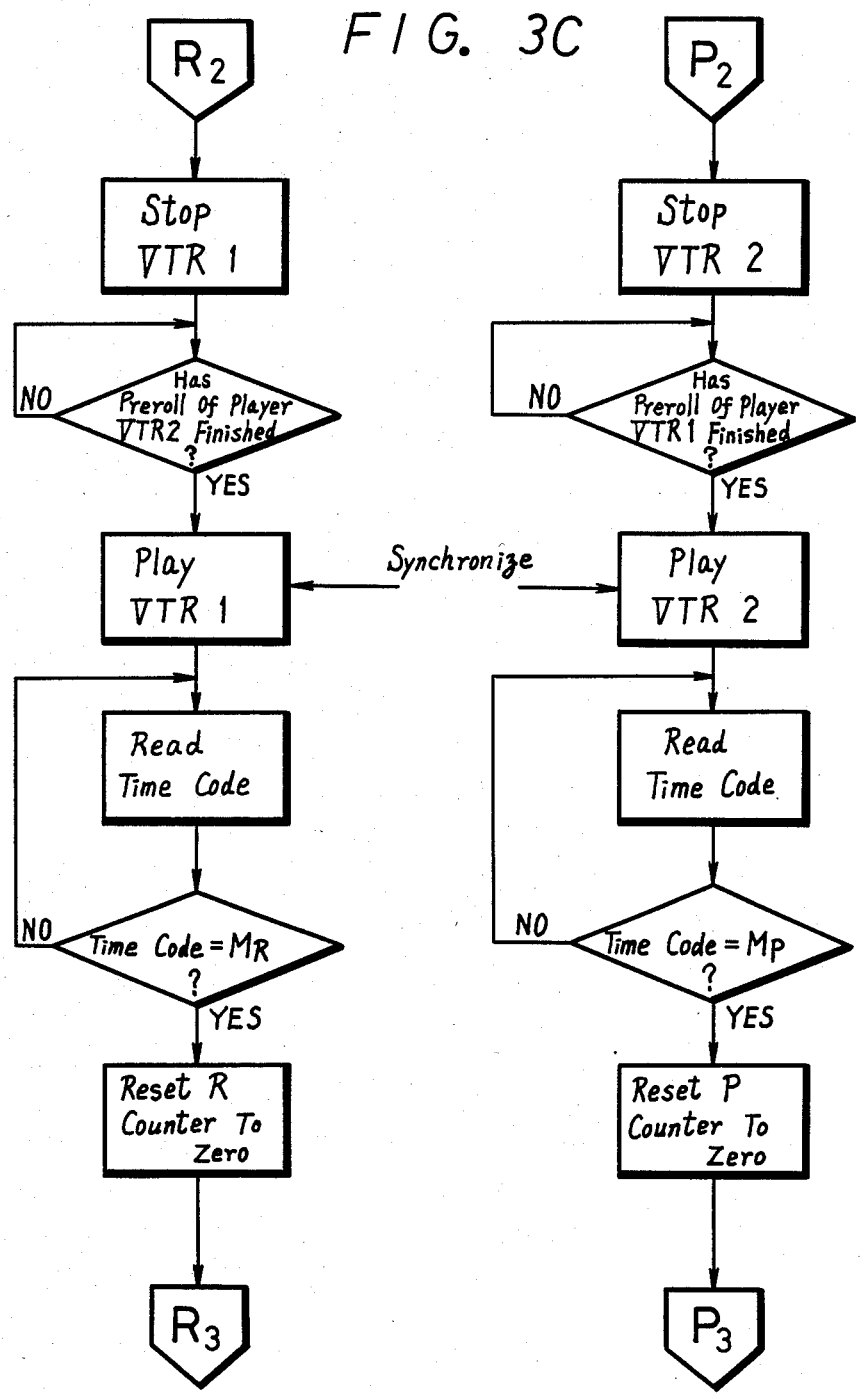

With reference to FIG. 3C, when the points corresponding to the preroll points on the tape are reached, recorder-VTR 1 and player-VTR 2 are stopped. Since the tape speed is quite slow, in the preferred embodiment, one-fifth times as fast as the normal recording and playback speed, recorder-VTR 1 and player-VTR 2 can be accurately stopped at the preroll points. Once the recorder-VTR 1 and player-VTR 2 are positioned at the preroll points, recorder-VTR 1 and player-VTR 2 are simultaneously placed into the play mode where the video tapes are advanced in synchronism. The time code signals recorded on the video tapes are read by time code readers 7R, 7P and tested against time code signals $M_R$ and $M_P$ stored in $M_R$ memory 12R and $M_P$ memory 12P, respectively. When the time code signals read from the video tapes coincide with time code signals $M_R$ and $M_P$ stored in memories 12R, 12P, time code counters 9R and 9P are reset to a predetermined number, which, in the preferred embodiment, is zero.

With reference to FIG. 3D, time code counters 9R and 9P are used to detect relative changes in the rates of occurrence subsequently read time code signals. The numbers contained in time code counters 9R, 9P are then compared with each other to determine whether they coincide. If the contents of time code counters 9R, 9P do not coincide, the playback speed of recorder-VTR 1 is adjusted faster or slower so that the contents of time code counters 9R and 9P coincide. The adjustments to the tape speed of recorder-VTR 1 are repeated until the tapes are synchronized. When the points on the video tapes corresponding to two seconds before the editing start points are identified, the tape speed of recorder-VTR 1 is maintained as hereinbefore described. Time code reader 7R is actuated to read the time code signal to determine whether the tape in recorder-VTR 1 is positioned at the editing start point (sometimes referred to as the "cut-in point").

Figure 3E:
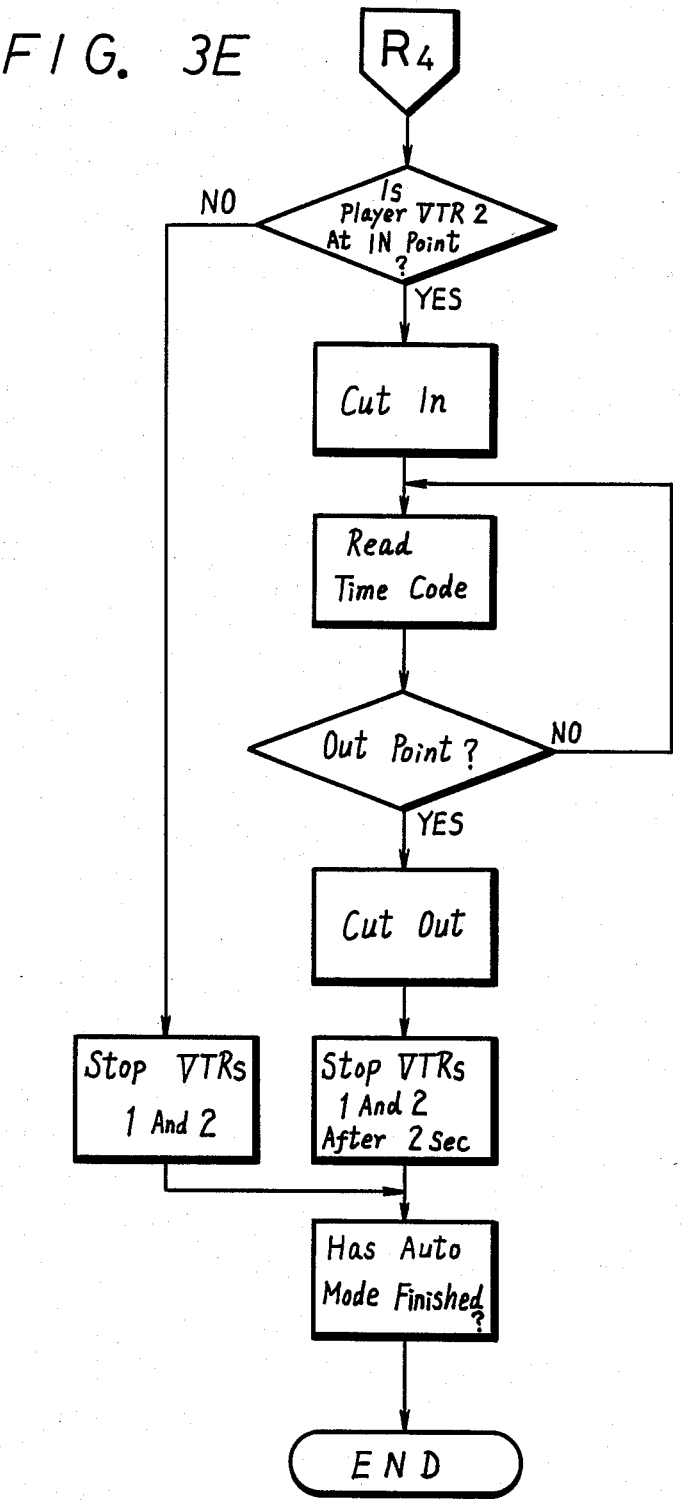

With reference to FIG. 3E, the position of the tape on player-VTR 2 is determined with respect to the editing start point when the tape on recorder-VTR 1 is positioned at the editing start point. When the tapes of recorder-VTR 1 and player-VTR 2 are both positioned at the editing start points, the editing operation begins. Two seconds after the editing end points on the tapes are passed, recorder-VTR 1 and player-VTR 2 are stopped to complete the automatic editing operation.

If, however, the tape of player-VTR 2 is not positioned at its editing start point when the tape on recorder-VTR 1 is positioned at its editing start point, the VTR's 1, 2 are stopped, since mis-editing would otherwise occur. The aforedescribed steps are then repeated so that the tape used with player-VTR 2 is positioned at its editing start point at the same time that the tape used with recorder-VTR 1 is positioned at its editing start point.

In accord with the present invention, data corresponding to time code signals are preset in control counters 8R and 8P at the editing start point during preroll. The preroll is subsequently performed using the data stored therein so that even if the time code signals recorded on the video tapes are not consecutive, an accurate prerolling can be performed. The time code signals $M_R$ and $M_P$ are read just before the preroll point (in the preferred embodiment, ten frames before the preroll point) and stored in memories 12R, 12P. The values of the time code signals stored in memories 12R and 12P can thus accurately indicate the distances from the editing start points since the tape running direction is not changed nor are the pinch rollers intermittently engaged with the respective capstans during the period from the identifying of the editing start points to the reading of time code signals $M_R$ and $M_P$. Accordingly, even if the time code signals are not consecutive on the tapes between the editing start points and the preroll points, an accurate editing can be performed.

Time code counters 9R, 9P accurately indicate the number of frames on the video tapes before the editing start points because they contain the number of changes of the time code signals detected by time code readers 7R, 7P. Accordingly, it is not important that the time code signals be consecutive to perform an accurate editing. In advancing the video tapes to the editing start points from the preroll points, the contents of time code counters 9R and 9P are reset to zero when the time code signals read by time code readers 7R, 7P coincide with time code signals $M_R$ and $M_P$ stored in memories 12R and 12P.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. An editing control apparatus for use with first and second video tape recording and/or reproducing apparatuses, each employing a video tape having time code signals and control signals recorded thereon, and which is advanced at a predetermined forward speed for recording and reproducing video signals thereon, comprising:
   time code reading means for reading said time code signals on said video tapes;
   control signal reading means for reading said control signals on said video tapes; and
   controller means for controlling said video tape recording and/or reproducing apparatuses in response to said time code signals and said control signals to position said video tapes at respective preroll points by rewinding said video tapes at a first speed substantially greater than said predetermined forward speed to first predetermined points, and thereafter further rewinding the respective video tapes at a second speed substantially less than said predetermined forward speed to the respective preroll points.

2. The editing control apparatus of claim 1; wherein said controller means rewinds said video tapes at an intermediate speed greater than said predetermined forward speed from said first predetermined points before said video tapes are further rewound at said second speed.

3. The editing control apparatus of claim 2; wherein said controller means changes said rewinding speeds of said video tapes in response to said control signals read by said control signal reading means.

4. The editing control apparatus of claim 2; wherein said first speed is faster than said intermediate speed.

5. The editing control apparatus of claim 4; wherein said first speed is approximately five times as fast as said forward speed, said intermediate speed is approximately two times as fast as said forward speed, and said second speed is approximately one-fifth as fast as said forward speed.

6. The editing control apparatus of claim 1; wherein said time code reading means comprises first and second time code readers respectively associated with said first and second video tape recording and/or reproducing apparatuses.

7. The editing control apparatus of claim 6; wherein said control signal reading means comprises first and second control signal readers respectively associated with said first and second video tape recording and/or reproducing apparatuses.

8. The editing control apparatus of claim 1; wherein said controller means stops said rewinding of said video tapes to position said video tapes at said preroll points in response to said time code signals.

9. The editing control apparatus of claim 8; and further comprising control signal counter means for counting said control signals read by said control signal reading means for use in stopping said rewinding.

10. The editing control apparatus of claim 9, in which said video tapes have respective editing start points located before said first predetermined points; and wherein said controller means presets said control signal counter means with a predetermined number for establishing said first predetermined points when said video tapes are positioned at said editing start points during said rewinding.

11. The editing control apparatus of claim 10; wherein said controller means changes said rewinding speeds in response to said control signals counted by said control signal counter means after said control signal counter means are preset.

12. The editing control apparatus of claim 9; wherein said control signal counter means comprises first and second counters respectively associated with said first and second video tape recording and/or reproducing apparatuses.

13. The editing control apparatus of claim 1; wherein said controller means actuates said first and second video tape recording and/or reproducing apparatuses to advance said video tapes in synchronism with each other in response to said time code signals read by said time code reading means after said video tapes are positioned at said preroll points.

14. The editing control apparatus of claim 13; and further comprising:
time code counter means for counting said time code signals read by said time code reading means;
memory means for storing said time code signals; and
comparing means connected to said time code counter means, said memory means, and said time code reading means for comparing the signals supplied therefrom.

15. The editing control apparatus of claim 14; wherein said controller means adjusts said forward speed of at least one of said video tape recording and/or reproducing apparatuses in response to comparisons between said time code signals counted from each of said video tapes to synchronize said advancing of said video tapes.

16. The editing control apparatus of claim 15; wherein said controller means actuates said memory means to store said time code signals read by said time code reading means when said video tapes are positioned at second predetermined points used in synchronizing said advancing of said video tapes.

17. The editing control apparatus of claim 16; wherein said controller means resets said time code counter means in response to comparisons by said comparing means of said time code signals read by said time code reading means after said video tapes are advanced with said time code signals stored in said memory means.

18. The editing control apparatus of claim 17; wherein said controller means resets said time code counter means when said time code signals read by said time code reading means are the same as said time code signals stored in said memory means.

19. The editing control apparatus of claim 18; wherein said counter means are reset to zero.

20. The editing control apparatus of claim 14; wherein said time code counter means comprises first and second time code counters respectively associated with said first and second video tape recording and/or reproducing apparatuses.

21. The editing control apparatus of claim 20; wherein said comparing means comprises first and second comparators respectively associated with said first and second video tape recording and/or reproducing apparatuses.

22. The editing control apparatus of claim 21; wherein said memory means includes first and second memories respectively associated with said first and second video tape recording and/or reproducing apparatuses.

23. The editing control apparatus of claim 1; wherein said controller means comprises a microcomputer.

24. The editing control apparatus of claim 23; and further comprising interface means connected between said time code reading means, said control signal reading means, and said microcomputer.

25. The editing control apparatus of claim 24; wherein said interface means comprises first and second interfaces respectively associated with said first and second video tape recording and/or reproducing apparatuses.

26. The editing control apparatus of claim 23; wherein said microcomputer includes a microprocessor and a memory unit.

27. The editing control apparatus of claim 26; wherein said memory unit includes a program stored therein.

28. The editing control apparatus of claim 26; wherein said memory unit comprises a read only memory and a random access memory.

29. A method of operating first and second video tape recording and/or reproducing apparatuses to edit video tapes employed therewith and having time code signals and control signals recorded thereon, and in which each of said tapes is advanced at a predetermined forward speed for recording and reproducing video signals thereon, comprising the steps of:
rewinding said video tapes to first predetermined points at a first speed substantially greater than said predetermined forward speed;
reading said time code signals and said control signals on said video tapes; and
further rewinding said video tapes at a second speed substantially less than said predetermined forward speed to respective preroll points in response to said time code signals and said control signals.

30. The method of claim 29; and further comprising the step of rewinding said video tapes at an intermediate speed greater than said predetermined forward speed from said first predetermined points before further rewinding at said second speed.

31. The method of claim 30; and further comprising, during said rewinding, the step of counting said control signals after respective editing start points on said video tapes are read with reference to said time code signals for changing said rewinding speed of said video tapes.

32. The method of claim 31; wherein said step of further rewinding at said second speed includes the step of positioning said video tapes at said preroll points in response to said reading of said time code signals.

33. The method of claim 32; and further comprising the steps of:
advancing said video tapes after said video tapes are positioned at said preroll points;
comparing said time code signals stored in a memory during said rewinding at second predetermined points with said time code signals read from said video tapes during said advancing of said video tapes; and counting said time code signals after said time code signals read from said video tapes are the same as said time code signals stored in said memory for synchronizing said advancing of said video tapes.

34. The method of claim 33; wherein said counting step includes the steps of:

comparing said time code signals counted from each of said video tapes; and controlling said forward speed of at least one of said video tape recording and/or reproducing apparatuses in response to said time code signal count comparisons to synchronize said advancing of said video tapes.

* * * * *